June 2, 1959     R. W. BURHANS     2,888,822
FUEL TESTING APPARATUS
Filed Aug. 14, 1956

INVENTOR
RALPH W. BURHANS
BY *Curtis, Morris & Safford*
ATTORNEYS

United States Patent Office 2,888,822
Patented June 2, 1959

2,888,822
FUEL TESTING APPARATUS

Ralph W. Burhans, Chagrin Falls, Ohio, assignor to The Standard Oil Company, Cleveland, Ohio, a corporation of Ohio Application August 14, 1956, Serial No. 603,970

5 Claims. (Cl. 73—35)

This invention relates to an improved apparatus for evaluating the burning quality of a fuel, such as gasoline, used to operate an internal combustion engine.

An object of this invention is to provide such apparatus which will give a quick and accurate indication of the burning characteristics of a fuel under test in an internal combustion engine.

Another object is to provide such apparatus which can be made at low cost, is easy and inexpensive to use and reliable in operation.

These and other objects will in part be understood from and in part pointed out in the description given hereinafter.

The evaluation of a motor fuel such as a new grade of gasoline presents several difficult problems. One of these problems is to determine how smoothly or evenly the fuel burns in the motor cylinder. Some motor fuel is capable of producing a great deal of energy but is not suitable as a motor fuel in a high compression engine because, instead of burning slowly with a progressive application of force after ignition in the cylinders of the motor, it burns suddenly with an instantaneous application of force. This causes knocking and adversely offsets the operation of the engine. To properly evaluate a motor fuel it is necessary, therefore, to find out not only the energy content of the fuel, but also how it burns in an engine cylinder under actual operation conditions.

One way of doing this is to provide the engine with a glass cylinder wall and then photograph each cycle of operation as the fuel is injected into the cylinder and burned. This requires not only the use of a high speed camera and the taking of a large number of pictures, but afterward the laborious analysis of all the pictures one by one. Another similar way of testing is to place a pressure responsive electric transducer in the head of a motor cylinder and connect the transducer to an oscilloscope which reproduces the pressures occurring in the cylinder over a period of time in a waveform that can be photographed and analyzed in the same manner as before.

To avoid this tedious procedure, some inventors in the past have sought to represent the waveform variation in cylinder pressure or selected portions thereof as a continuous sampling on a mechanical meter in which the readings remain steady or vary slowly. Others have tried to average these variations in cylinder pressures occuring during successive cycles to obtain a single value representative of all of them. Neither of these ways has been wholly satisfactory because they were only roughly accurate. The present invention avoids the difficulties of systems used in the past without sacrificing useful accuracy and simplicity.

In accordance with the present invention, a large number of pressure waveforms derived from an engine cylinder during successive burning cycles of a fuel under test are sampled in sequence, and these samplings added to give a single composite waveform which is truly representative of the burning quality of the fuel. One particular advantage of this arrangement is that the composite curve is much easier to evaluate and hence quickly gives as accurate an indication of the quality of the fuel as the tedious study of a large number of the actual waveforms produced from pressure variations during successive fuel burning cycles in the cylinder. Another advantage is that this single composite waveform can be reproduced on a relatively slow speed apparatus, such as a mechanical pen and ink recorder having a top frequency, for example, of only a few cycles per second.

The apparatus of the present invention for sampling pressure variations in the engine cylinder is extremely simple in construction and produces superior results over apparatus previously used. The apparatus includes a mechanically operated electric sampling switch connected in series with a pressure transducer in the head of an engine cylinder and a recording device which, for example, can be a slow speed mechanical recorder. The switch is operated from the crank shaft of the engine through a gear train which actuates the switch at progressively later times in succeeding fuel burning cycles in the engine cylinder. These samples of cylinder pressure are then put together to give a single composite waveform accurately representative of the typical waveform of pressure variations produced by the fuel during each cycle of burning. The number of samples of the actual pressure variations that are taken to reproduce the single composite waveform can be made very large. Thus, the rate of generation of the composite waveform for a given engine speed easily can be made small enough to be reproduced on almost any mechanical pen and ink recorder.

A better understanding of the invention together with a fuller appreciation of its many advantages will best be gained from a study of the following description given in connection with the accompanying drawings in which.

Figure 1:
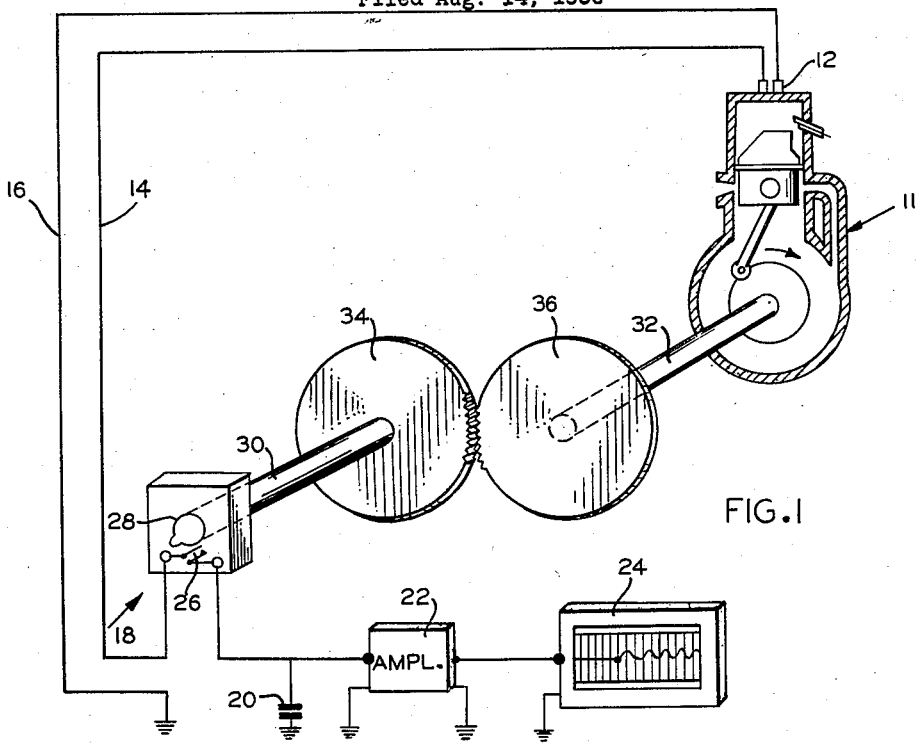
Figure 1 is a schematic representation of a two cycle engine having a cylinder coupled to test apparatus embodying features of the invention.

Referring to Figure 1 there is schematically represented an engine cylinder 11 having an electrical pressure transducer 12, of known kind, mounted in its head. Such a transducer reproduces an electric signal which varies directly with the pressure in the engine cylinder 11 such as, for example, a variation in voltage directly in accordance with variations in pressure. The transducer may incorporate a piezoelectric crystal which generates an electric current having a voltage directly proportional to the pressure applied. Running from this transducer are the two electric wires 14, 16. The other end of wire 16 is grounded while wire 14 is connected to one side of the switch generally indicated at 18. The electric signals passing over wires 14 and 16 may, for example, correspond to the waveform as shown in Figure 2a.

Referring to Figure 1, instantaneous samples of these waveforms of pressure variation are applied through switch 18 to a storage capacitor 20, then to an amplifier 22 and finally to a mechanical pen and ink recorder 24. The waveform portions or samples are assembled at the recorder to reproduce a single composite waveform, illustrated in Figure 2d which is closely like the typical waveform of pressure actually occurring in cylinder 11.

Switch 18 is adapted to make momentary samplings of the electric waveforms on wires 14, 16. These samplings are taken at progressively later (or earlier) times in successive cycles. To this end, switch 18 includes the normally open switch contacts 26 which are adapted to be closed for an instant during each revolution of cam 28. These contacts are closed and opened for the same relative periods of times during each revolution of cam 28. However, this cam is being rotated with a slight lag or gain with respect to the crank shaft 32 of engine 11. This is accomplished through, for example, a gear train having two meshed gears 34 and 36 carried respectively on shafts 30 and 32. Gear 36 may have 100 teeth while gear 34 may have 101 teeth of the same pitch. Thus, for one revolution of gear 36, gear 34 makes only 100/101 revolutions to produce a slight lag in the rotation of shaft 30 relative to shaft 32. This will cause switch contacts 26 to close at progressively later times in successive fuel burning cycles in the cylinder of the engine 11.

Figure 2:
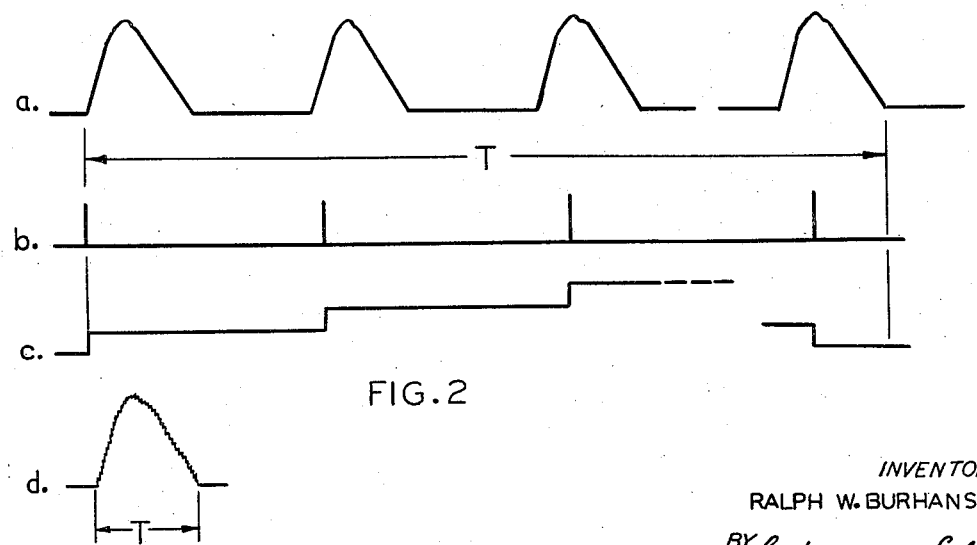
Figure 2a is an illustration of waveforms produced by plotting the pressure in the engine cylinder against the time during the fuel is burned therein.
Figure 2b illustrates the progressive sampling of the waveforms in Figure 2a by the electric switch between the pressure transducer in the engine cylinder and the mechanical recorder.
Figure 2c represents the step by step generation of the composite waveform produced by this sampling.
Figure 2d illustrates a composite waveform produced by the recorder in accordance with the invention.

The successive instantaneous samplings resulting from the momentary closing of contacts 26 are illustrated by the spikes in Figure 2b. By comparing the occurrence times of these spikes with the times of the pressure waveforms shown in Figure 2a, it can be seen all of the "slices" or samples taken one by one from the pressure waveforms of successive fuel burning cycles will, when combined at their relative time of occurrence make a single composite waveform having a shape representative of the actual pressure waveform during any cycle with the particular fuel. Such a composite waveform is illustrated in Figure 2d and has a time ordinate T, during which period a large number of actual pressure waveforms have been produced as indicated in Figure 2a. Referring again to Figure 1, the samples of instantaneous pressure are applied, in turn, one after another to capacitor 20. The voltage level of each sample is stored and maintained on the capacitor 20 during the time between successive samples. During this time, the mechanical indicator element of recorder 22 can unhurriedly move to a new position corresponding to the increment of change in the voltage level applied to and stored on capacitor 20. Thus, sample after sample is recorded and a composite waveform traced out. As many of these composite waveforms as desired can be recorded and thereafter studied.

Transducer 12 advantageously has a low output impedance relative to capacitor 20 so that the capacitor can be fully charged or discharged to a new level during each closure of contacts 26.

The above description of the invention is intended in illustration and not in limitation. Minor changes in the embodiment illustrated may occur to those skilled in the art and these can be made without departing from the spirit or scope of the invention as set forth.

What is claimed is:

1. Fuel testing apparatus of the character described comprising a pressure transducer connected to the cylinder of an internal combustion engine, said transducer being adapted to generate successive electric signals corresponding to the cyclic pressures in said cylinder, voltage storage means, switch means for connecting said transducer to said storage means momentarily during successive electric signals to impress samples thereof on said storage means, driving means responsive to the fuel burning cycles in said cylinder to operate said switch means at progressively changing times in successive signals, and recorder means connected to said storage means to reproduce a composite of a multiplicity of said electric signals.

2. The combination of elements as in claim 1 wherein said switch means includes a normally open pair of contacts adapted to be closed momentarily and when closed completing a conductive circuit between said transducer and storage means, and wherein said driving means includes a drive shaft operated through one revolution by the engine during each fuel burning cycle in the cylinder, a driven shaft having a cam mounted thereon, a pair of meshed gears connecting the driving and driven shaft, said cam being adapted to close said contacts briefly once each revolution of said driven shaft, and said gears having an unequal number of teeth to rotate the driven shaft at a slightly different speed than the drive shaft.

3. The combination of elements as in claim 2 wherein said recorder means includes a mechanical pen and ink recorder connected to said voltage storage means and adapted to respond to the voltage level thereon.

4. Fuel testing apparatus for evaluating the quality of fuel burned in an engine cylinder comprising means to produce a series of electrical waveform signals corresponding to the actual pressure variations in said cylinder, storage means adapted to store at any instant the level of said electrical waveform signals, mechanical recorder means connected to said storage means and adapted to trace out a line having a displacement from a reference axis proportional to the signal level on said storage means, switch means for momentarily sampling said electrical waveform signals and for applying said samples to said storage means, and driving means for operating said switch means in slowly changing phase with the cycles of operation of said cylinder.

5. An apparatus for determining the burning characteristics of a fuel in the cylinder of an internal combustion engine comprising a device for transforming pressure variations in the engine cylinder to an electric signal which varies proportionately with the pressure, recorder means responsive to step-by-step changes in electric signal, a circuit for said electric signal having a switch and connected to operate the recorder means, and means driven by said engine to operate said switch once during each fuel burning cycle in said cylinder, and said last named means having a speed changing device to operate said switch at progressively changing times with respect to successive fuel burning cycles in said cylinder.

References Cited in the file of this patent

UNITED STATES PATENTS

| | | |
|---|---|---|
| 2,085,203 | Schlesman et al. | June 29, 1937 |
| 2,236,422 | Boley | Mar. 25, 1941 |
| 2,255,809 | Prescott | Sept. 16, 1941 |
| 2,496,338 | Barton | Feb. 7, 1950 |
| 2,688,248 | Hart et al. | Sept. 7, 1954 |